Patented Aug. 22, 1944

2,356,214

UNITED STATES PATENT OFFICE 2,356,214

FORMULA FOR A COMPOSITION OF CERAMIC MATTER

Romildo Casciani, Brooklyn, N. Y., assignor of one-third to Max Bernstein and one-third to Jack Meltzer, both of Brooklyn, N. Y., and one-third to Julius H. Funk, St. Louis, Mo.

No Drawing. Application July 25, 1941, Serial No. 404,077

1 Claim. (Cl. 106—92)

The object of my invention is the production of a ceramic compound material, together with all articles of manufacture formed therefrom.

To date, all ceramic products or substances, such as porcelain, stoneware and pottery, must be put through a firing process which destroys the uniformity of the finished products by warping and fire-shrinkage, increases its sensitivity to rapid temperature changes, lessens its usefulness as an insulator and its resistance to pressure.

My invention consists of a mixture of magnesite, Florida clay, talc, bentonite, asbestos, silicate, dextrine and Portland cement.

In preparing the composition I use the ingredients in the following proportions, viz:

|  | Ounces |
|---|---|
| Magnesite | 15 |
| Florida clay | 25 |
| Talc | 26 |
| Bentonite | 4 |
| Asbestos | 15 |
| Silica | 5 |
| Dextrine | 3 |
| Portland cement | 7 |

To this mixture I add a pint solution consisting of 5½ ounces of calcium chloride and water. This solution makes my product malleable and easier to handle in the mold or die.

I thoroughly mix these ingredients, the length of time depending upon the fineness or thickness of the product desired, and pour it into the prepared die, which presses out the finished product. It should be noted that the firing or heating process which is both cumbersome and expensive is entirely eliminated.

The resulting product has a dull surface and can be used for fuses, insulating, electrical connections, etc.

When, however, I desire this product to have a smooth and glossy surface for use in household appliances, bathroom fixtures, pottery, tile, etc., I rapidly dip the finished product in a solution containing the following ingredients in the following proportions:

|  | Ounces |
|---|---|
| Gum Arabic | 5 |
| English China clay | 15 |
| Silica | 10 |
| Cobalt | 15 |
| Whiting | 20 |
| Ball clay | 15 |
| Zinc oxide | 10 |
| Magnesia chloride | 5 |
| Glaze spar | 5 |

A spray of this solution over the surface of the product gives even better results.

The ceramic product produced by my invention can obviously be used for as many household, bathroom, factory, tile, or building articles as dies can be made for the various articles.

My invention produces an improved, lightweight, fire-proof composition. It is a non-conductor of heat, is acid-resistant, is impervious to water, has great tensile powers, and is more durable than ordinary porcelain, pottery and stoneware. The elimination of applied heat prevents resulting fire-shrinkage and warping and gives a uniform thickness and shape throughout. The standard quality of the product greatly aids in assembling and use in industry where precision is required.

Moreover, by eliminating the firing process, production in relation to speed, and equipment is stepped up about 1500%, expense of manufacture is decreased by 80%, and a far superior ceramic product results.

The present invention accordingly provides a new ceramic material having improved mechanical, thermal, and chemical properties, and especially higher qualities of uniformity, which can be manufactured much cheaper and quicker than by the former method of heat fusion.

I claim:

A ceramic composition consisting of the product formed by molding without heat and evaporating to dryness a mixture of and substantially in the proportions of 15 ounces of magnesite, 25 ounces of Florida clay, 26 ounces of talc, 4 ounces of bentonite, 15 ounces of asbestos, 5 ounces of silica, 3 ounces of dextrine, and 7 ounces of Portland cement with a solution of 5½ ounces of calcium chloride and water.

ROMILDO CASCIANI.